United States Patent
Wenger et al.

(10) Patent No.: US 11,034,213 B2
(45) Date of Patent: Jun. 15, 2021

(54) METHODS AND SYSTEMS FOR MONITORING AND DISPLAYING ENERGY USE AND ENERGY COST OF A TRANSPORT VEHICLE CLIMATE CONTROL SYSTEM OR A FLEET OF TRANSPORT VEHICLE CLIMATE CONTROL SYSTEMS

(71) Applicant: THERMO KING CORPORATION, Minneapolis, MN (US)

(72) Inventors: Scott Wenger, Minneapolis, MN (US); Katherine Holmstrom, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 194 days.

(21) Appl. No.: 16/147,704

(22) Filed: Sep. 29, 2018

(65) Prior Publication Data
US 2020/0101820 A1    Apr. 2, 2020

(51) Int. Cl.
*B60H 1/00*    (2006.01)
*G05D 23/19*    (2006.01)

(52) U.S. Cl.
CPC ..... *B60H 1/00985* (2013.01); *G05D 23/1934* (2013.01)

(58) Field of Classification Search
CPC ............ B60H 1/00985; B60H 1/00735; B60K 2370/174
See application file for complete search history.

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Alan D Hutchinson
*Assistant Examiner* — Andy Schneider
(74) *Attorney, Agent, or Firm* — Hamre, Schumann, Mueller & Larson, P.C.

(57) ABSTRACT

A method for monitoring and displaying energy use and energy cost of a transport vehicle climate control system is provided. The method includes a controller monitoring and measuring energy parameters of the transport vehicle climate control system. The method also includes calculating energy utilization of the transport vehicle climate control system based on the energy parameters. Also, the method includes calculating energy costs of the transport vehicle climate control system based on the calculated energy utilization. Further, the method includes displaying the calculated energy utilization and the calculated energy costs of the transport climate control system on a user interface.

17 Claims, 4 Drawing Sheets

(56) References Cited

U.S. PATENT DOCUMENTS

| | | |
|---|---|---|
| 5,231,849 A | 8/1993 | Rosenblatt |
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,652,330 B1 | 11/2003 | Wasilewski |
| 6,688,125 B2 | 2/2004 | Okamoto et al. |
| 6,753,692 B2 | 6/2004 | Toyomura et al. |
| 6,925,826 B2 | 8/2005 | Hille et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,134,339 B2 | 3/2012 | Burlak et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,742,620 B1 | 6/2014 | Brennan et al. |
| 8,760,115 B2 | 6/2014 | Kinser et al. |
| 8,764,469 B2 | 7/2014 | Lamb |
| 8,767,379 B2 | 7/2014 | Whitaker |
| 8,818,588 B2 | 8/2014 | Ambrosio et al. |
| 8,862,356 B2 | 10/2014 | Miller |
| 8,912,683 B2 | 12/2014 | Dames et al. |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2003/0201097 A1 | 10/2003 | Zeigler et al. |
| 2005/0057210 A1 | 3/2005 | Ueda et al. |
| 2005/0065684 A1 | 3/2005 | Larson et al. |
| 2006/0284601 A1 | 12/2006 | Salasoo et al. |
| 2007/0052241 A1 | 3/2007 | Pacy |
| 2007/0192116 A1 | 8/2007 | Levitt |
| 2008/0177678 A1 | 7/2008 | Di Martini et al. |
| 2008/0281473 A1 | 11/2008 | Pitt |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0195349 A1* | 8/2009 | Frader-Thompson ............ G01D 4/002 340/3.1 |
| 2009/0314019 A1 | 12/2009 | Fujimoto et al. |
| 2009/0320515 A1 | 12/2009 | Bischofberger et al. |
| 2010/0045105 A1 | 2/2010 | Bovio et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0118916 A1 | 5/2011 | Gullichsen |
| 2011/0162395 A1 | 7/2011 | Chakiachvili et al. |
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2011/0290893 A1 | 12/2011 | Steinberg |
| 2012/0000212 A1 | 1/2012 | Sanders et al. |
| 2012/0116931 A1 | 5/2012 | Meyers |
| 2012/0153722 A1 | 6/2012 | Nazarian |
| 2012/0198866 A1 | 8/2012 | Zeidner |
| 2012/0310416 A1* | 12/2012 | Tepper ............ F24F 11/62 700/276 |
| 2013/0000342 A1 | 1/2013 | Blasko et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1* | 12/2016 | Abiprojo ............ G06Q 10/06 700/276 |
| 2017/0030728 A1 | 2/2017 | Baglino et al. |
| 2017/0057323 A1 | 3/2017 | Neu et al. |
| 2017/0063248 A1 | 3/2017 | Lee et al. |

(56) References Cited

U.S. PATENT DOCUMENTS

| | | |
|---|---|---|
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0050753 A1 | 2/2020 | Davis et al. |
| 2020/0076029 A1* | 3/2020 | Litz .................. B60H 1/00392 |
| 2020/0086744 A1 | 3/2020 | Schumacher et al. |
| 2020/0101820 A1 | 4/2020 | Wenger |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

(56) References Cited

OTHER PUBLICATIONS

U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 17/015,194, titled "Prioritized Power Delivery for Facilitating Transport Climate Control", filed Sep. 9, 2020, 41 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,190, titled "Optimized Power Distribution to Transport Climate Control Systems Amongst One or More Electric Supply Equipment Stations", filed Sep. 9, 2020, 43 pages.
Extended European Search Report, issued in the corresponding European patent application No. 19200001.6 dated Jan. 27, 2020, 9 pages.

* cited by examiner

METHODS AND SYSTEMS FOR MONITORING AND DISPLAYING ENERGY USE AND ENERGY COST OF A TRANSPORT VEHICLE CLIMATE CONTROL SYSTEM OR A FLEET OF TRANSPORT VEHICLE CLIMATE CONTROL SYSTEMS

FIELD

Embodiments of this disclosure relate generally to a climate control system for a transport vehicle. More specifically, the embodiments relate to methods and systems for monitoring and displaying energy use and energy cost of a transport vehicle climate control system or a fleet of transport vehicle climate control systems.

BACKGROUND

A climate control system, (such as a heating, ventilation, and air conditioning (HVAC) system for a passenger vehicle (e.g., a passenger bus, passenger railcar, etc.), a transport refrigeration system (TRS) for a transport unit (e.g., a truck, a container (such as a container on a flat car, an intermodal container, etc.), a box car, a semi-tractor, a bus, or other similar transport unit), etc. may be included on a transport vehicle to condition air of an internal space (e.g., passenger compartment, cargo space, etc.) of the transport vehicle. In some transport vehicles, the climate control system can be installed externally (e.g., on a rooftop of the transport vehicle, on a front wall of the transport vehicle, etc.). The climate control system can provide a comfortable environment for the passengers in the transport vehicle or a desired environment for cargo stored in the transport vehicle.

SUMMARY

This disclosure relates generally to a climate control system in a transport vehicle. More specifically, the embodiments relate to methods and systems for monitoring and displaying energy use and energy cost of a transport vehicle climate control system or a fleet of transport vehicle climate control systems.

The embodiments described herein can provide an operator of a transport vehicle with a climate control system or a fleet of transport vehicles with a climate control system a reliable and/or accurate way to measure the overall energy cost of operating a climate control system. It can be difficult to isolate the true energy cost of operating a climate control system from the total energy cost of operating a transport vehicle or a fleet of transport vehicles when the power source for powering the climate control system is integrated with other systems of the transport vehicle. For example, it can be difficult to isolate energy utilization of a climate control system powered by the transport vehicle's prime mover (either directly or indirectly via a prime mover driven alternator) from other systems of the transport vehicle. The embodiments described herein can provide a reliable and/or accurate way to measure and monitor energy utilization of the climate control system that can provide sufficient resolution to enable experimentation and anomaly detection.

In particular, the embodiments described herein can reliably and accurately capture transport vehicle climate control system energy costs. The embodiments described herein can capture transport vehicle climate control system energy costs for mixed-vehicle (e.g., various climate control system vintages, various manufacturers, various power systems, etc.) fleets.

Energy utilization of a climate control system of a transport vehicle can be a significant contributor to the energy consumption of a transport vehicle or fleet of transport vehicles. In some embodiments, the methods and systems disclosed herein can directly and frequently measure and monitor isolated energy usage of a climate control over time. In other embodiments, the methods and systems disclosed herein can frequently measure all pertinent variables associated with operation of a climate control system obtain energy usage of the climate control system over time.

In some embodiments, the embodiments described herein can measure, monitor and report on energy costs associated with one or more transport vehicle climate control systems with sufficient resolution to be able to identify variations due to intentional (e.g., experimental) or unintentional (e.g., system entropy or breakdown) changes in the operation of the one or more transport vehicle climate control systems. The embodiments described herein can leverage remote machine data connectivity and algorithm(s) for establishing the energy use and subsequent energy cost of transport vehicle climate control system(s) operation, along with trending energy use patterns and energy costs so that a comparison to a specific transport vehicle over time and a comparison to other transport vehicles can be drawn. Trending of energy use and energy costs can allow for climate control system optimization strategies to be employed.

The embodiments described herein can provide frequent procurement of climate control system parameters, can send the obtained parameters to an onboard or remote server, and can use the obtained parameters to, for example, calculate a total energy utilization of the climate control system, an energy use per unit of time for operation of the climate control system, a total energy cost of the climate control system, an energy cost per unit of time for operation of the climate control system, etc. to understand performance of the climate control system. Also, the embodiments described herein can itemize energy use and/or energy cost by the climate control system to aid in operational enhancements and identify components of the climate control system that can be further optimized.

The embodiments described herein can also provide direct and frequent measurement of the isolated energy input to a particular component(s) of the climate control system, can combine calculations of the climate control system parameters for components that may not allow for direct energy input measurement, and can combine this data to create an itemized view of energy use and/or energy cost by the climate control system to aid in operational enhancements of the climate control system and identify components of the climate control system that can be further optimized.

In one embodiment, a method for monitoring and displaying energy use and energy cost of a transport vehicle climate control system is provided. The method includes a controller monitoring and measuring energy parameters of the transport vehicle climate control system. The method also includes calculating energy utilization of the transport vehicle climate control system based on the energy parameters. Also, the method includes calculating energy costs of the transport vehicle climate control system based on the calculated energy utilization. Further, the method includes displaying the calculated energy utilization and the calculated energy costs of the transport climate control system on a user interface.

In another embodiment, a climate control system for a transport vehicle is provided. The climate control system includes a refrigeration circuit and a controller. The refrigeration circuit is configured to control an environmental condition of an internal space of the transport vehicle, wherein the refrigeration circuit includes a compressor, an exterior heat exchanger, and an interior heat exchanger. The controller is configured to control operation of the climate control system. Also, the controller is configured to monitor and measure energy parameters of a transport vehicle climate control system, calculate energy utilization of the transport vehicle climate control system based on the energy parameters, and calculate energy costs of the transport vehicle climate control system based on the energy parameters. Also, a user interface is configured to receive the calculated energy utilization and the calculated energy costs and is configured to display the calculated energy utilization and the calculated energy costs of the transport climate control system.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to a climate control system in a transport vehicle. More specifically, the embodiments relate to methods and systems for monitoring and displaying energy use and energy cost of a transport vehicle climate control system or a fleet of transport vehicle climate control systems.

A climate control system may be generally configured to control one or more environmental conditions (e.g., temperature, humidity, atmosphere, air quality, etc.) in an internal space (e.g., passenger compartment, cargo space, etc.) of a transport vehicle (e.g., a passenger bus, a passenger railcar, a truck, a container (such as a container on a flat car, an intermodal container, etc.), a box car, a semi-tractor, etc.). Generally, the internal space of a transport vehicle can be supplied with fresh air (e.g., outside air) and/or conditioned air (e.g., air conditioned by a refrigeration circuit of the climate control system) by the climate control system.

Figure 1A:
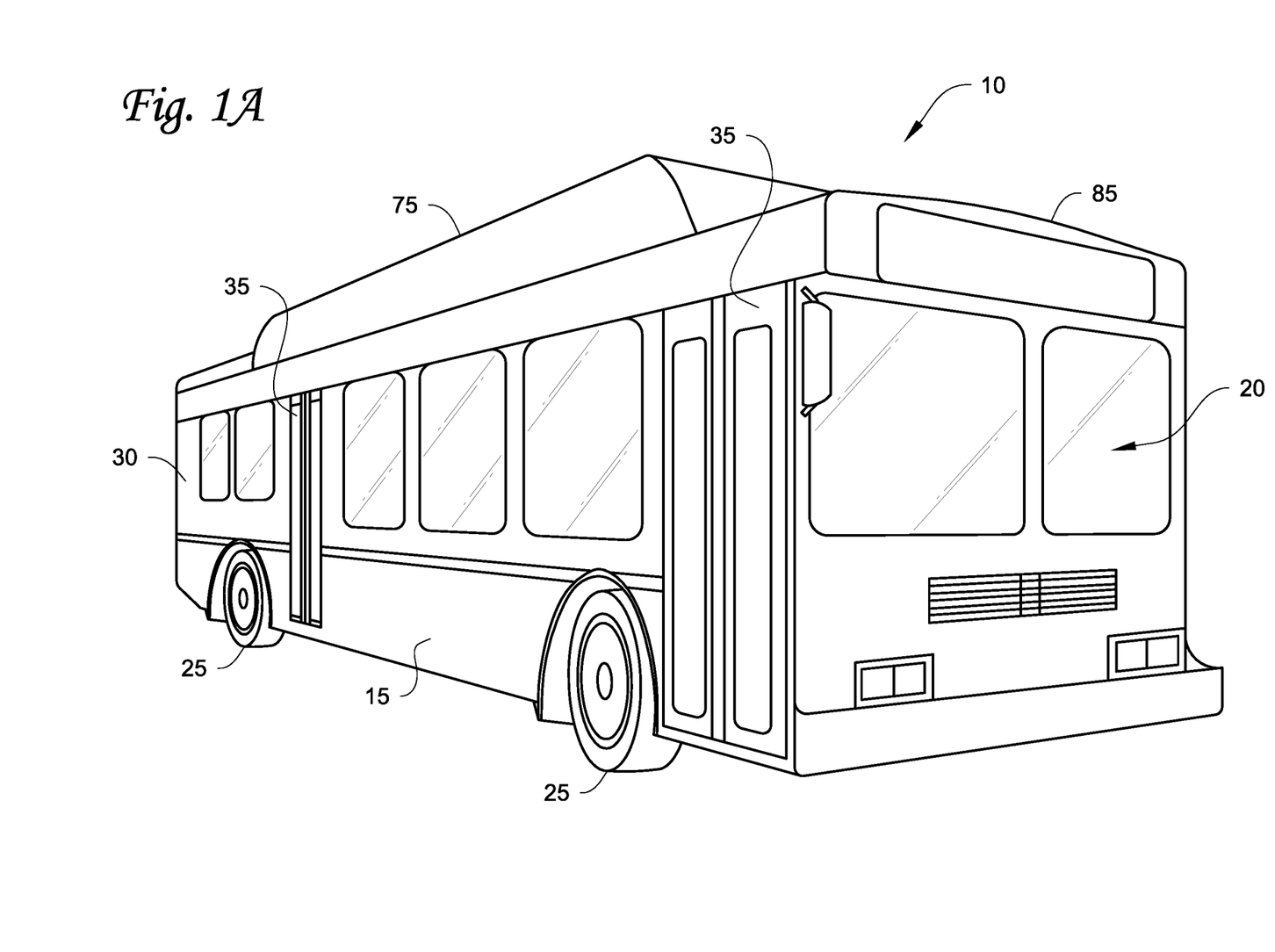
FIG. 1A is a perspective view of a passenger vehicle including a climate control system, according to one embodiment.

FIG. 1A is a perspective view of a vehicle 10 including a climate control system, according to one embodiment. In the embodiment illustrated in FIG. 1A, the vehicle 10 is a mass-transit bus that can carry passenger(s) (not shown) to one or more destinations. In other embodiments, the vehicle 10 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses.

FIG. 1A shows that the vehicle 10 includes a frame 15, a passenger compartment 20 supported by the frame 15, wheels 25, and a compartment 30. The frame 15 includes doors 35 that are positioned on a side of the vehicle 10. As shown in FIG. 1A, a first door 35 is located adjacent to a forward end of the vehicle 10, and a second door 35 is positioned on the frame 15 toward a rearward end of the vehicle 10. Each door 35 is movable between an open position and a closed position to selectively allow access to the passenger compartment 20. The vehicle 10 also includes a climate control system 75 attached to the frame 15 on a roof 85 of the vehicle 10. The climate control system 75 includes a refrigeration circuit (see FIG. 2) and is configured to provide conditioned air within the passenger compartment 20.

The compartment 30 is located adjacent the rear end of the vehicle 10, can include a power system (see FIG. 2) that is coupled to the frame 15 to drive the wheels 25. In some embodiments, the compartment 30 can be located in other locations on the vehicle 10 (e.g., adjacent the forward end, etc.).

Figure 1B:
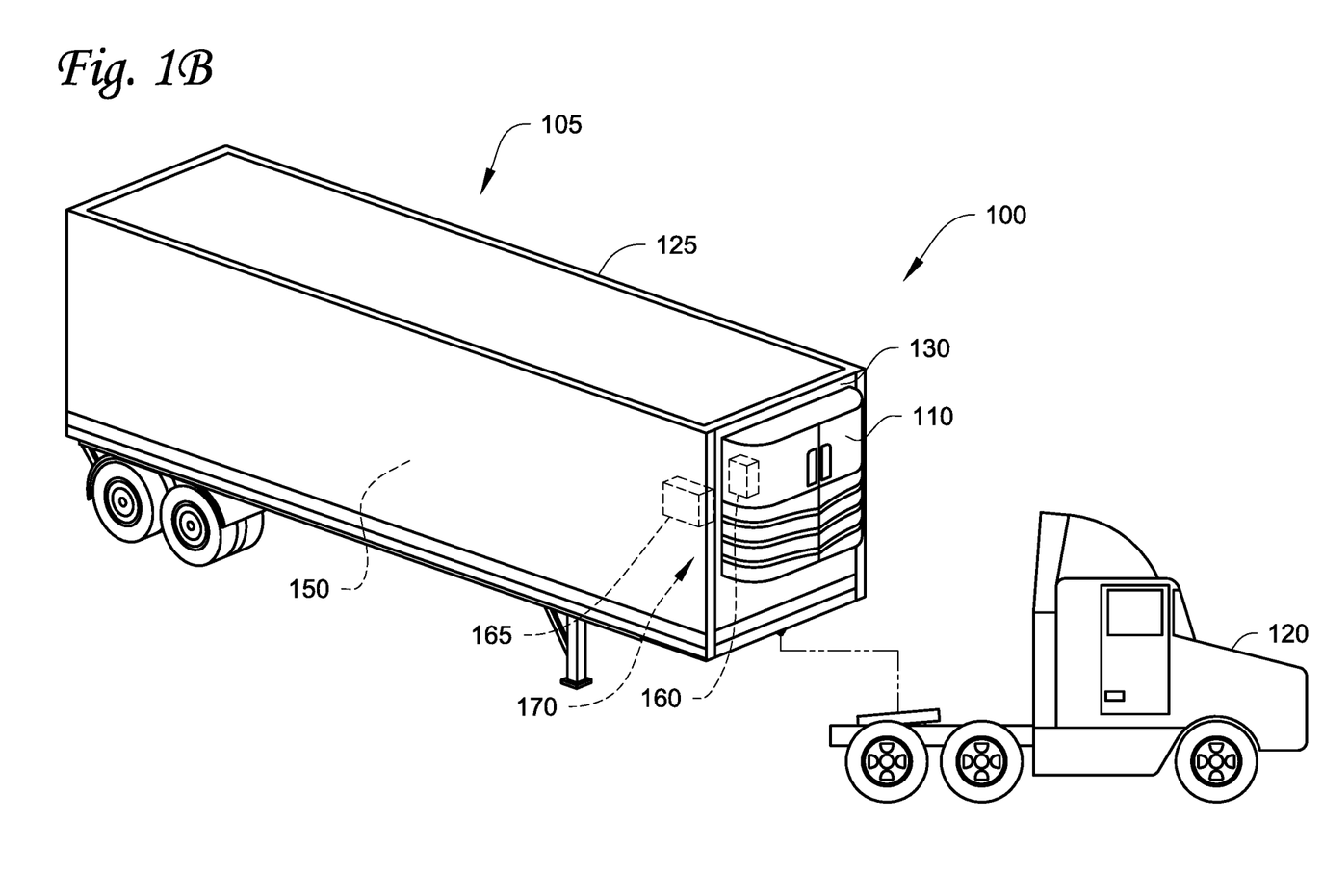
FIG. 1B is a perspective view of a refrigerated transport unit attached to a tractor, according to one embodiment.

FIG. 1B illustrates one embodiment of a refrigerated transport unit 105 attached to a tractor 110. The refrigerated transport unit 105 includes a climate control system 100 for a transport unit 125. The tractor 120 is attached to and is configured to tow the transport unit 125. The transport unit 125 shown in FIG. 1B is a trailer. It will be appreciated that the embodiments described herein are not limited to tractor and trailer units, but can apply to any type of transport unit (e.g., a container on a flat car, an intermodal container, etc.), a truck, a box car, or other similar transport unit. The transport unit 125 can include one or more doors (not shown) that are movable between an open position and a closed position to selectively allow access to a cargo space 150.

The climate control system 100 includes a climate control unit (CCU) 110 that provides environmental control (e.g. temperature, humidity, air quality, etc.) within the cargo space 150 of the transport unit 125. The climate control system 100 also includes a climate controller 170 and one or more sensors (not shown) that are configured to measure one or more parameters of the climate control system 100 and communicate parameter data to a climate controller 170.

The CCU 110 is disposed on a front wall 130 of the transport unit 125. In other embodiments, it will be appreciated that the CCU 110 can be disposed, for example, on a rooftop or another wall of the transport unit 125. The CCU 110 includes a refrigeration circuit (see FIG. 2) for conditioning air to be provided within the cargo space 150. The CCU 110 can also include a power system (see FIG. 2) to power components of the climate control system 100 (e.g., a compressor, one or more fans and blowers, one or more sensors, one or more solenoid valves, etc.)

The programmable climate controller 170 may comprise a single integrated control unit 160 or that may comprise a distributed network of climate controller elements 160, 165. The number of distributed control elements in a given network can depend upon the particular application of the principles described herein. The climate controller 170 is configured to control operation of the climate control system 100.

Figure 2:
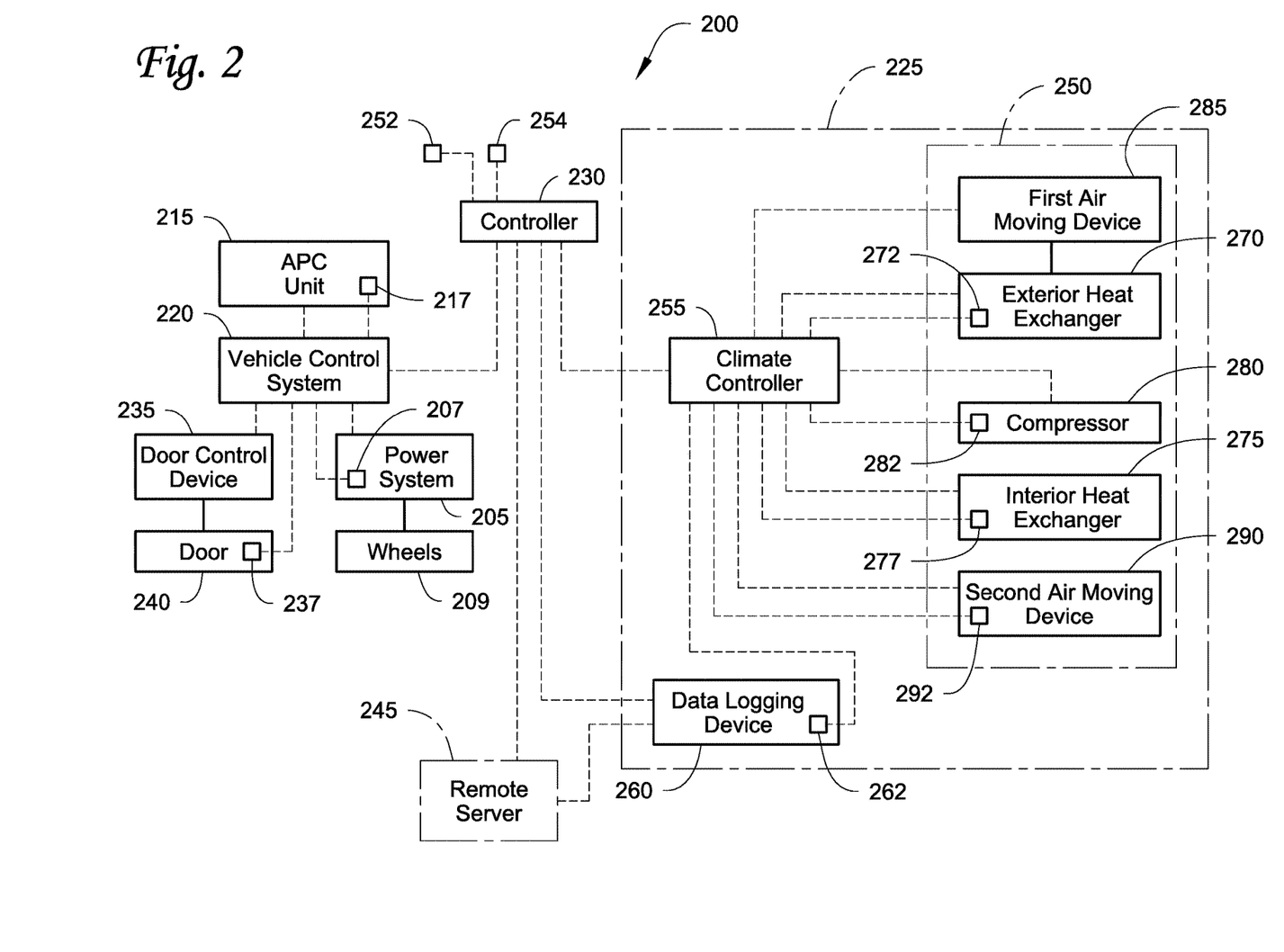
FIG. 2 is a schematic view of components of the transport vehicle shown in either of FIGS. 1A and 1B, according to one embodiment.

FIG. 2 illustrates a schematic view of components of a transport vehicle 200 such as the transport vehicle 10 shown in FIG. 1A or the transport unit 100 shown in FIG. 1B. FIG. 2 shows a power system 205 that can include a prime mover (e.g., an internal combustion engine), or alternatively, a hybrid engine that includes an electrical power system coupled to the prime mover. In other embodiments, the power system 205 can be a fully electrical power system (e.g., energy storage device) without a corresponding prime mover. Hereinafter, the term "power system" shall be used to represent all such power systems, and should not be construed to limit the scope of the application solely to prime movers.

In the embodiment shown in FIG. 2, the power system 205 can provide most, if not all of the power to vehicle components and accessories, in addition to powering wheels 209 (e.g., the wheels 25 shown in FIG. 1A), and can include an "off" state and an "on" state. Generally, the vehicle 200 is operable at one or more speeds, and the power system 205 can be the main driving component or mechanism for the speed that the vehicle 200 travels. The power system 205 can be further operable at relatively high loads and relatively low loads. The load that the power system 205 is under is defined by the amount of work per time unit that must be provided by the power system 205 to move and operate the vehicle 200. In other words, the load of the power system 205 can be defined by the amount of output power that must be provided by the power system 205 to move and operate the vehicle 200. For example, the power system 205 can be under relatively high loads when the vehicle 200 is moving uphill or over rough terrain. The power system 205 can be under relatively low loads when the vehicle 200 is moving downhill, when the vehicle 200 is moving over relatively flat terrain, or when the power system 205 is idling. Generally, a change in the load of the power system 205 can be indicated by a change in the output power of the power system 205 that is measured, for example, in kilowatts or horsepower.

In some embodiments, the power system 205 can be dedicated to powering a climate control system 210. In these embodiments, the power system 205 may not power the wheels 209. In these embodiments, the power system 205 can be located in a TRU (e.g., the TRU 110) or can be disposed apart from the TRU such as in an undermount configuration (e.g., as a separate generator set or the like).

A power system sensor 207 is coupled to the power system 205 to sense a condition and/or usage of the power system 205, and to generate a signal indicative of the power system condition. In some embodiments, the power system sensor 207 can be configured to detect the load under which the power system 205 is operating. In these embodiments, the power system sensor 207 can generate a signal indicative of the power system load. In other embodiments, the sensor 207 can be configured to detect startup of the power system 205 from the "off" state.

With continued reference to FIG. 2, the transport vehicle 200 can also include an automated passenger counter (APC) unit 215 that is operable to track the number and duration of passengers (e.g., people, animals, etc.) in the internal space of the transport vehicle 200 at any time. The APC unit 215 includes an APC sensor 217 that senses when a passenger enters or exits the transport vehicle 200. It has been found that passengers (e.g., people, animals, etc.) have natural convection (i.e., thermal plume) that radiates heat and moisture to the surrounding environment. A conditioned internal space can be affected by the thermal plume surrounding a passenger. Thus, data from the APC unit 215 can be used to calculate a relative humidity within the internal space of the transport vehicle 200 at any given time.

The transport vehicle 200 also includes a vehicle control system 220, a climate control system 225 (e.g., the climate control system 75 shown in FIG. 1A and the climate control system 200 shown in FIG. 1B), and a controller 230 in communication with the vehicle control system 220 and the climate control system 225. The vehicle control system 220 can be located anywhere on the transport vehicle 200, and is in communication electrical and/or mechanical components (not shown) of the transport vehicle 200. The vehicle control system 220 is also in communication with a door control device 235, the power system 205, and the vehicle positioning system 215 to receive the respective signals from a door sensor 237, the power system sensor 207, and the vehicle position sensor 217. In some embodiments, additional vehicle conditions of the transport vehicle 200 may also be sensed by one or more sensors.

The transport vehicle 200 includes a door control device 235 that is coupled to each door 240 (only one shown). The door control device 235 is operable to move the doors 240 between the respective open positions and closed positions. In some embodiments, the door control device 235 is manually operated by an operator of the transport vehicle 200 to open and close the doors 240. In other embodiments, the door control device 235 can automatically open and close the doors 240 (e.g., via electronic signals, etc.). In still other embodiments, one door control device 235 can be provided for each door 240 of the vehicle 200 to independently open and close each door 240.

The door sensor 237 is coupled to each door 240 to sense when and for how long one or all doors 240 are in the open position, and to generate a signal indicative of the respective positions and durations of the doors 240. For example, the door sensor 237 can generate a first signal indicative of one or all doors 240 in the open position and the duration of the open position, and can generate a second signal indicative of the doors 240 in the closed position and the duration of the closed position. The door opening frequency and duration information obtained by the door sensor 237 can be combined with information obtained from the APC unit 215 to determine the effect of thermal plume within the internal space.

Alternatively, no signal may be affirmatively generated by the door sensor 237 when the doors 240 are in the closed position (i.e., the sensor is "silent" when the doors 240 are in the closed position). However, the silence of the door sensor 237 when the doors 240 are closed can be indicative of the doors 240 in the closed position. In some embodiments, one door sensor 237 may be coupled to both or all doors 240. In other embodiments, a door sensor 237 may be provided for each door 240 to independently sense the position of the respective door 240.

FIG. 2 shows that the climate control system 225 includes a refrigeration circuit 250, a climate controller 255, and a data logging device 260. The refrigeration circuit 250 is a vehicle climate control circuit that can be operable to control one or more environmental conditions (e.g., temperature, humidity, atmosphere, air quality, etc.) of the internal space of the transport vehicle 200 based on geolocation specific data, climate control data, and passenger/load data. The refrigeration circuit 250 includes an exterior heat exchanger 270, an interior heat exchanger 275, a compressor 280, a first air moving device 285, and a second air moving device 290. In the illustrated embodiment, the first and second air moving devices 285, 290 are fans. The refrigeration circuit 250 may also include additional components (not shown). A working fluid (e.g., refrigerant) flows through the refrigeration components to provide conditioned air to the internal space (e.g., the passenger compartment 20 shown in FIG. 1A and the cargo space 150 shown in FIG. 1B).

The speed of the refrigeration circuit 250 can be defined as the speed of working fluid flow through the exterior heat exchanger 275 and/or the interior heat exchanger 270. The speed of the refrigeration circuit 250 can be also defined as the speed of the compressor 280, the speed of the first air moving device 285, and/or the speed of the second air moving device 290, in addition to the speed of other components of the refrigeration circuit 250.

In some constructions, the exterior heat exchanger 270 can cool heated working fluid that flows from the compressor 280 in a cooling mode of the refrigeration circuit 250. The exterior heat exchanger 270 may include a gas cooler, or alternatively a condenser, depending on the type of working fluid routed through the refrigeration circuit 250. In other constructions, the exterior heat exchanger 270 can heat cooled working fluid in a heating mode of the refrigeration circuit 250.

Although not shown, the interior heat exchanger 275 (e.g., evaporator, etc.) can be in fluid communication with the exterior heat exchanger 270 to receive cooled working fluid and to transfer heat from air passing over the interior heat exchanger 275 to the working fluid prior to the conditioned air entering the internal space. The compressor 280 is in fluid communication with the exterior heat exchanger 270 and the interior heat exchanger 275 to compress heated working fluid received from the interior heat exchanger 275 and to provide working fluid flow throughout the refrigeration circuit 250. In some embodiments, the compressor 280 can be a one-speed (e.g., On state and Off state) compressor. In other embodiments, the compressor 280 can be a two-speed compressor (e.g., high speed and low speed). In yet some other embodiments, the compressor 280 can be a variable speed compressor that can operate at multiple speeds. The speed of the compressor 280 can be based in part on a desired pressure of the working fluid within the refrigeration circuit 250.

Generally, the first and second air moving devices 285, 290 include fans or blowers that direct airflow across one or more components of the refrigeration circuit 250. In some embodiments, the first and second air moving devices 285, 290 can be one-speed (e.g., On state and Off state) moving devices. In other embodiments, the first and second air moving devices 285, 290 can be two-speed (e.g., high speed and low speed) moving devices. In some embodiments, the first and second air moving devices 285, 290 can be variable speed moving devices that can operate at multiple speeds. The first air moving device 285 is coupled to the exterior heat exchanger 270, and the speed of the first air moving device 285 can be based on desired airflow across the exterior heat exchanger 270. The first air moving device 285 can generally direct air across the exterior heat exchanger 270 to cool heated, compressed working fluid that flows from the compressor 280.

The second air moving device 290 is coupled to the interior heat exchanger 275, and the speed of the second air moving device 290 can be based on desired airflow across the interior heat exchanger 275. The second air moving device 290 can generally direct air across the interior heat exchanger 275 to condition air entering the internal space via heat transfer with cool working fluid flowing through the interior heat exchanger 275.

The climate controller 255 is in communication with the compressor 280 to control compressor capacity, and is in communication with the first and second air moving devices 285, 290 to control the speed of the first and second air moving devices 285, 290. The climate controller 255 is operable to vary the refrigeration circuit 250 between an "off" state and an "on" state, and to further control the capacity of the refrigeration circuit 250 based in part on the desired temperature of the internal space, and further based on ambient conditions adjacent to the climate control system 225. In some embodiments, the climate controller 255 can include a memory portion (not shown) that stores a desired temperature setpoint within the internal space, a desired humidity setpoint within the internal space, and a discharge temperature setpoint.

The climate controller 255 is also in communication with a discharge temperature sensor 292, an interior heat exchanger sensor 277, a compressor sensor 282, and an exterior heat exchanger sensor 272. When present, the climate controller 255 can also be in communication with one or more internal space temperature sensors 252 and/or one or more internal space humidity sensors 254. The climate controller 255 may also be in communication with other sensors (not shown) that are coupled to components of the refrigeration circuit 250. The discharge temperature sensor 292 is disposed adjacent to the second air moving device 290 to sense a discharge temperature of conditioned air directed into the internal space.

The interior heat exchanger sensor 277 is coupled to the interior heat exchanger 275 to sense a temperature of the working fluid flowing through the interior heat exchanger 275, and to generate a signal indicative of the working fluid temperature. In other embodiments, the interior heat exchanger sensor 277 can sense the temperature of air flowing over the interior heat exchanger 275. In still other embodiments, the interior heat exchanger sensor 277 can sense a pressure of working fluid that flows through the interior heat exchanger 275.

The compressor sensor 282 is coupled to the compressor 280 to sense a pressure of working fluid that flows through the compressor 280. In some embodiments, the compressor sensor 282 can monitor the pressure of the working fluid that enters the compressor 280 (i.e., the suction pressure). In other embodiments, the compressor sensor 282 can monitor the pressure of working fluid that exits the compressor 280 (i.e., the discharge pressure). In still other embodiments, the compressor sensor 280 may be configured to sense the discharge pressure and the suction pressure of the working fluid flowing through the compressor 280.

The exterior heat exchanger sensor 272 is coupled to the exterior heat exchanger 270 to sense a temperature of working fluid exiting the exterior heat exchanger 270, and to generate a signal indicative of the sensed temperature. In some embodiments, the exterior heat exchanger sensor 272 can be located in a refrigeration line (not shown) that is proximate to and downstream of the exterior heat exchanger 270.

The one or more internal space temperature sensors 252 can be disposed at various locations within the internal space to sense a temperature within the internal space. The one or more internal space humidity sensors 254 can be disposed at various locations within the internal space to sense humidity within the internal space.

The refrigeration circuit 250 can be operable at various capacities, ranging from a zero capacity in an Off state to a full capacity in an On state. The capacity of the refrigeration circuit 250 is the capacity at which the refrigeration circuit 250 is able to condition air that enters the internal space.

A full capacity of the refrigeration circuit 250 can correspond to a pull-down cooling mode of the climate control system 225, and a reduced capacity (i.e., a capacity that is less than full capacity) of the refrigeration circuit 250 can correspond to a reduced capacity cooling mode or a noise reduction mode of the climate control system 225. Generally, the speed of one or more climate control system components in the reduced capacity mode or the noise reduction mode are slower than the speed of the same components in the pull-down cooling mode, and operation of the climate control system 225 in the noise reduction mode can reduce perceived noise that emanates from the climate control system 225. For example, when the climate control system 225 operates at full capacity (i.e., in the pull-down cooling mode), the refrigeration circuit 250 can operate at a speed that can quickly reduce the temperature within the internal space from a near ambient temperature to a desired temperature setpoint. In some embodiments, when the climate control system 225 operates at a reduced capacity (e.g., in the reduced capacity mode, the noise reduction mode, etc.), the refrigeration circuit 250 can operate at a speed that is slower than the speed necessary to maintain the desired temperature setpoint of the internal space.

The climate control system 225 is configured to operate in a variety of operating modes including, for example, a continuous cooling mode, a cycle-sentry cooling mode, a pull-down cooling mode, a reduced capacity cooling mode, a heating mode, a defrost mode, an emissions (e.g., noise, $CO_2$, particular matter, nitrogen oxide, etc.) reduction mode, a fuel reduction mode, a humidity reduction mode, a ventilation mode, a reheating mode, etc. The continuous cooling mode can allow the compressor 280 to continuously remain in an On state so that the refrigeration circuit 250 can provide cooled air into the internal space. The cycle-sentry cooling mode can allow the compressor 280 to operate in a pattern of On state and Off state cycles over a period of time so that the refrigeration circuit 250 can provide cooled air into the internal space. The pull-down cooling mode can allow the refrigeration circuit 250 to operate at a full capacity to quickly reduce the temperature within the internal space from a near ambient temperature to a desired temperature setpoint. The reduced capacity cooling mode can allow the refrigeration circuit 250 to operate at a reduced capacity to slow down or stop temperature reduction within the internal space. The heating mode can allow the refrigeration circuit 250 to provide heated air to the internal space to increase the temperature within the internal space. The defrost mode can allow the refrigeration circuit to defrost, for example, evaporator coils of the interior heat exchanger 275. The emissions reduction mode can allow the refrigeration circuit 250 to operate such that emissions of one or more of noise, $CO_2$, particular matter, nitrogen oxide, etc. from the climate control system 225 is reduced. The fuel reduction mode can allow the climate control system 225 to reduce the amount of fuel used to operate the climate control system 225. The humidity reduction mode can reduce humidity in the internal space by, for example, running the secondary air moving device 290 independently of the compressor 280.

The data logging device 260 is configured to receive and store real-time information regarding the transport vehicle 200 and the climate control system 225. The data logging device 260 can also operate as a telematics unit and transmit the real-time information regarding the transport vehicle 200 and the climate control system 225 to a host service. In some embodiments, the data logging device 260 can be a first party data logging and telematics device of the climate control system 225 or a third party data logging and telematics device that is separate from the climate control system 225. The data logging device 260 can also include a vehicle position sensor 262. The vehicle position sensor 262 can be a global positioning system sensor in communication with a global positioning system (not shown) that determines the location of the transport vehicle 200.

In some embodiments, the data logging device 260 can utilize, for example, a global system for mobile communications (GSM) or a general packet radio service (GPRS) to access real-time ambient temperature and/or humidity data external to the location of the transport vehicle 200. In some embodiments, the data logging device 260 can access the real-time ambient temperature and/or humidity information at the location determined by the vehicle position sensor 262 from, for example, the national oceanic and atmospheric administration (NOAA).

It will be appreciated that in other embodiments, the vehicle position sensor 262 can be part of, for example, the climate controller 255, the controller 230, the vehicle control system 220, or another device of the transport vehicle 200. Also, in some embodiments, the data logging device 260 can be embedded in or with the climate controller 255.

The controller 230 is disposed in the vehicle 200, and generally can be located anywhere on the vehicle 200. The controller 230 is in communication with the vehicle control system 220 and the climate control system 225 to monitor conditions of the vehicle 200 and the climate control system 225, and to control the climate control system 225 in response to the sensed temperature within the internal space and the sensed vehicle conditions. In some embodiments, the controller 230 can be a stand-alone controller 230 in addition to the vehicle control system 220 and the climate controller 255. In other embodiments, the vehicle control system 220 and/or the climate controller 255 can be a part of or subsumed in the controller 230.

In some embodiments, the controller 230 and/or the data logging device 260 can communicate with a remote server 245 that is separate and away from the transport vehicle 200. The controller 230 and/or the data logging device 260 can transmit energy parameters to the remote server 245 and the remote server can then calculate energy utilization of the climate control system 225, calculate energy costs of the climate control system 225, etc.

Figure 3:
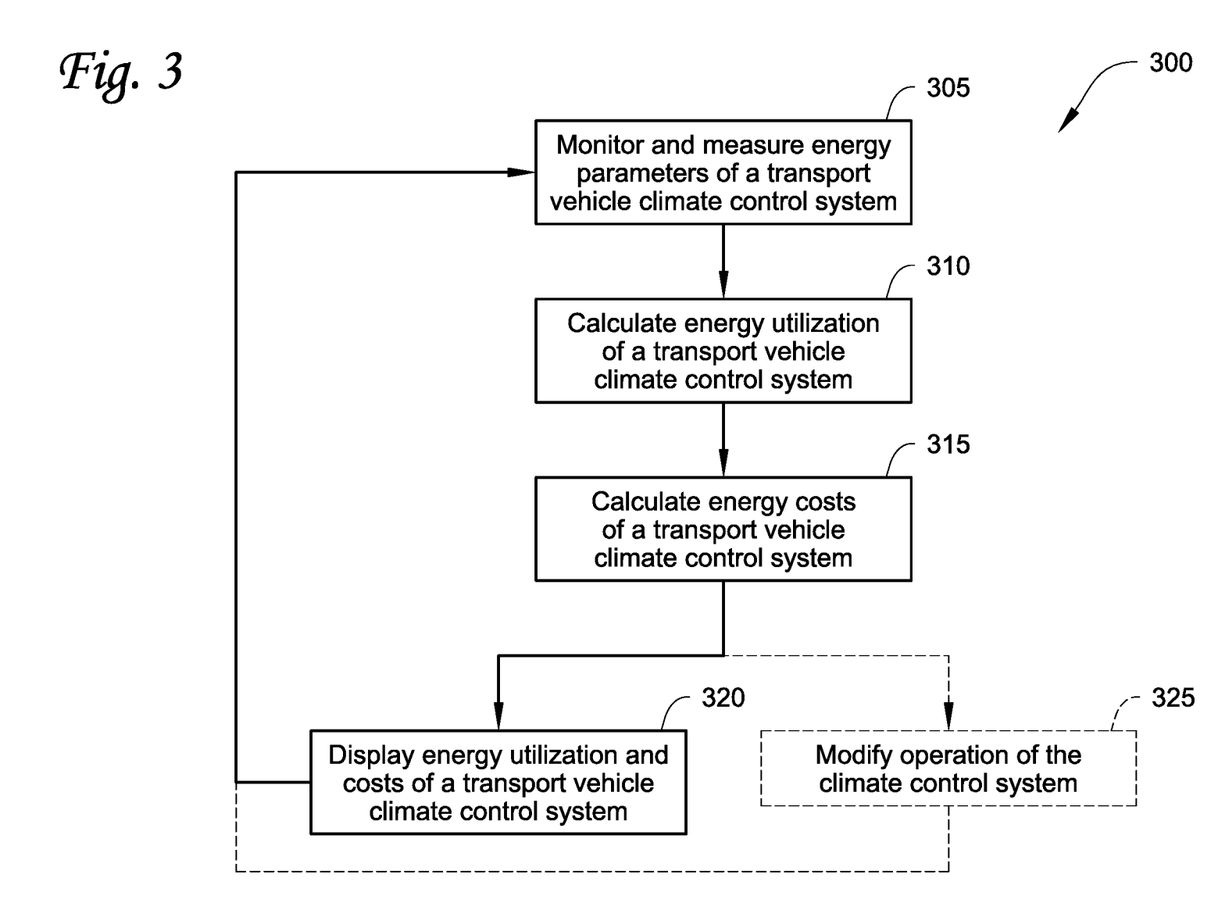
FIG. 3 is a flowchart of a method for monitoring and displaying energy use and energy cost of the climate control system or a fleet of climate control systems, according to one embodiment.

FIG. 3 illustrates a flowchart of a method 300 for monitoring and displaying energy use and energy cost of the climate control system 200 or a fleet of climate control systems. The method 300 begins at 305 where the controller 230 monitors and measures energy parameters of the climate control system 225. Generally, the compressor 280 and the first and second air moving devices 270, 275 can be the largest energy users of the climate control system 225. Accordingly, 305 can include the controller 230 monitoring and storing one or more of: an operating time of the compressor 280; a rotational velocity of the compressor 280; an operational frequency of the compressor 280; and a voltage and/or current supplied to the compressor 280. This can also include the controller 230 monitoring and storing one or more of: an operating time of the first and second air moving devices 270, 275; a rotational velocity of the first and second air moving devices 270, 275; an operational frequency of the first and second air moving devices 270, 275; and a voltage and/or current supplied to the first and second air moving devices 270, 275.

In some embodiments, the controller 230 can also monitor and store one or both of an operating status, and a voltage and/or current supplied to a heating element (not shown) of the climate control system 225.

In some embodiments, the controller 230 can also monitor and store a battery cooling status of a battery/battery pack (not shown) of, for example, the power system 205, an auxiliary power system, etc. providing power to the climate control system 225.

In some embodiments, the controller 230 can also monitor and store one or more of an operating time, and a voltage and/or current supplied to one or more control electronics (e.g., the controller 230, the vehicle control system 220, the climate controller 255, the APC unit 215, the data logging device 260, etc.

In some embodiments, the controller 230 can also monitor and store one or more of an operating status, a position, a voltage and/or current supplied to ancillary equipment (e.g., dampers, valves, sensors, etc.), etc. of the climate control system 225.

In some embodiments, the controller 230 can monitor and store climate control system temperatures including, for example, an ambient temperature where the transport vehicle 200 is located, a desired temperature setpoint of the climate control system 225, an internal space temperature, duct temperature(s) of the climate control system 225, etc.

In some embodiments, the controller 230 can monitor and store climate control system pressures including, for example, an ambient pressure where the transport vehicle 200 is located, a suction pressure of the compressor 280, a discharge pressure of the compressor 280, etc.

In some embodiments, the controller 230 can monitor and store climate control system temperatures including, for example, an ambient temperature at the location where the transport vehicle 200 is located, a desired temperature setpoint of the climate control system 225, an internal space temperature, duct temperature(s) of the climate control system 225, etc.

In some embodiments, the controller 230 can monitor and store an operating mode (e.g., a continuous cooling mode, a cycle-sentry cooling mode, a pull-down cooling mode, a reduced capacity cooling mode, a heating mode, a defrost mode, an emissions (e.g., noise, $CO_2$, particular matter, nitrogen oxide, etc.) reduction mode, a fuel reduction mode, a humidity reduction mode, a ventilation mode, a reheating mode, etc.) of the climate control system 225.

In some embodiments, where one or more of the above noted components of the climate control system 225 are directly driven via electrical energy, parameters including those listed above may be assured with direct voltage and/or current measurements to calculate power consumption at a given period of time. These measurements can be reported directly from the components to the controller 230.

In some embodiments, where one or more of the above noted components of the climate control system 225 are electrically isolated, a total electrical power input may be available from one or more of the controller 230, the vehicle control system 220, the climate controller 255), a battery management system, and a monitoring system (e.g., the data logging device 260).

The method then proceeds to 310.

At 310, the controller 230 uses the energy parameters obtained at 305 to calculate energy utilization of the climate control system 225. In some instances, this can include a conversion of voltage and/or current measurements to obtain power ($P=V*I$). In other instances, more complicated energy calculations that make use of, for example, physics-based equations, modeling, simulation testing, etc. The controller 230 may include equations and/or lookup tables to convert the energy parameters obtained at 305 into energy utilization values. For example, when the compressor 280 is directly driven by a prime mover of the power system 205, energy utilization of the compressor 280 can be calculated, for example, based on model incorporating an operating time of the compressor 280, an operational frequency of the compressor 280, and one or more system level pressures (e.g., suction pressure at the compressor 280, discharge pressure at the compressor 280, any other working fluid pressure within the refrigeration circuit 250, etc.) of the of the working fluid the climate control system 225.

While this embodiment describes the controller 230 calculating the energy utilization of the climate control system 225, in other embodiments, the energy parameters obtained at 305 can be transmitted to, for example, the remote server 245 which then calculates the energy utilization of the climate control system 225.

The method then proceeds to 315.

At 315, the controller 230 calculates energy costs of the climate control system 225 for a given period of time and operating conditions based on the energy utilization calculated at 310. In some embodiments, the controller can access energy cost inputs, for example, from the remote server 245 including, for example, a current price of a prime mover fuel (e.g., diesel fuel, compressed natural gas, etc.) for powering a prime mover of the power system 205, efficiency of the climate control system 225 (or components of the climate control system 225), a current price of electrical energy (which can vary, for example, based on time of day and current demand on the electrical grid, etc.), renewable energy (e.g., solar energy storage, wind energy storage, etc.) offsets when available, etc.

In some embodiments, the controller 230 can calculate an energy score based on a number of relative factors without attempting to estimate actual energy use and energy costs. In particular, the controller 230 can access energy use trends for the climate control system 225 or a fleet of transport vehicles with climate control systems. The energy use trends can include outlier operating conditions of the climate control system 225 or outlier transport vehicles with anomalous energy consumption. The energy trends can also include thresholds (e.g., red/yellow/green thresholds) based on the outlier information. In some embodiments, the controller 230 can then calculate an energy score based on, for example, a comparison between energy use trends of the climate control system 225 (including, for example, outlier operating conditions) and the current operating conditions of the climate control system 225. For example, the controller 230 can implement a red/yellow/green assessment of energy use relative to trending or other climate control systems in a given fleet, or can implement a numerical score use for comparison to other climate control systems in a given fleet or to historical trends of the climate control system 225. In some embodiments, the controller 230 can then calculate an energy score based on, for example, a comparison between energy use trends of a fleet of transport vehicles with climate control systems and the absolute energy use of the climate control system 225.

While this embodiment describes the controller 230 calculating the energy costs of the climate control system 225, in other embodiments, the remote server 245 can calculate the energy utilization of the climate control system 225 and calculate the energy costs of the climate control system 225.

The method then proceeds to 320 and can optionally concurrently proceed to 325.

At 320, energy utilization and energy costs of the climate control system 225 is displayed. In particular, a user interface can be provided as part of an application accessible to, for example, an operator of the transport vehicle 200, a customer, a user managing a fleet of transport vehicles with climate control systems, etc. The application can be accessed, for example, by a smart phone device, a tablet computer, a personal computer, etc. In some embodiments, the user interface may be presented on the transport vehicle 200.

The user interface can enable the viewer to visualize and compare energy utilization of the climate control system 225, energy costs of the climate control system 225, and/or energy utilization and energy costs of a fleet of transport vehicles with climate control systems.

In some embodiments, the user interface can provide a graphical comparison between two or more climate control systems that are part of a fleet of transport vehicles having climate control systems. The graphical comparison can be of, for example, total energy utilization, energy use per unit of time in operation, total energy cost, energy cost per unit of time in operation, etc. for one or more components (e.g., the compressor 280, the air moving devices 270, 275, etc.) of the climate control system 225 or the climate control system 225 as a whole.

In some embodiments, the user interface can provide a graphical time-domain historical data of the climate control system 225. The time-domain historical data being displayed can be, for example, total energy utilization, energy use per unit of time in operation, total energy cost, energy cost per unit of time in operation, etc. for one or more components of the climate control system 225 or the climate control system 225 as a whole.

In some embodiments, the user interface can provide a graphical time-domain data of the climate control system 225 or a fleet of climate control systems to reveal, for example, particular times of day per week, particular routes of the transport vehicle(s) 200, locations of the transport vehicle(s) 200, etc. The time-domain historical data being displayed can be, for example, total energy utilization, energy use per unit of time in operation, total energy cost, energy cost per unit of time in operation, etc. for one or more components of the climate control system 225 or the climate control system 225 as a whole.

In some embodiments, the user interface can provide a red/yellow/green assessment of energy use relative to trending or other climate control systems in a given fleet, or can implement a numerical score use for comparison to other climate control systems in a given fleet or to historical trends of the climate control system 225.

In some embodiments, the controller 230 or remote server 245 can automatically monitor the energy cost and/or energy use of the climate control system 225 or individual components of the climate control system 225 and can send or display an alert to a user on the user interface when a significant change occurs to the climate control system 225 (e.g., an alert threshold is exceeded, a moving average of energy use and/or energy cost crosses a threshold, the climate control system 225 exceeds a calculation indicating anomalous operation of the climate control system 225 relative to other climate control systems in the fleet, etc.). The alert threshold discussed above can include, for example, a total energy cost threshold, a compressor utilization threshold, a temperature setpoint threshold, a humidity setpoint threshold, etc. In some embodiments, the alert threshold can be based on a particular moment in time or based on a moving average, for example if the moving average of a climate control system setpoint exceeds a certain threshold. Accordingly, the controller 230 can provide energy budgeting of the transport vehicle 200 or for a fleet of transport vehicles. Anomalous operation may include, for example, cooling cycles running continuously but not reducing the internal space temperature, a higher than normal compressor runtime for one transport vehicle in a fleet relative to the other transport vehicles, or setpoints or other temperatures or humidities of the transport vehicle 200 that diverge from other transport vehicles of the same fleet or from a moving average of the transport vehicle 200.

In some embodiments, the controller 230 or the remote server 245 can prioritize maintenance between a plurality of climate control systems within a fleet of climate control systems based on historical or relative energy costs to one another to operate. For example, if the transport vehicle 200 is experiencing higher-than-normal (or higher-than-average) energy utilization relative to the rest of the transport vehicle fleet, the maintenance schedule can be updated to prioritize the transport vehicle as it is consuming additional energy (or costing more to operate) than the rest of the fleet. The maintenance schedule for one or more of the climate control systems can then be displayed on the user interface.

In some embodiments, the user interface can provide a report to the user demonstrating energy utilization and energy costs of a fleet of transport vehicles with climate control systems. The controller 230 or the remote server 245 can also determine and provide an energy conservation program for the user interface to display to the user.

The method then proceeds back to 305.

Optionally, at 325 the controller 230 can modify operation of the climate control system 225 based on the energy utilization calculated at 310 and/or the energy costs calculated at 315.

In some embodiments, when the power system 205 includes multiple energy sources (e.g., vehicle prime mover, vehicle battery, auxiliary battery pack, solar power, utility power, etc.), the controller 230 can automatically choose the energy source(s) to be used based on, for example, the least expensive option given the energy parameters obtained at 305, the energy utilization associated with a given period of time calculated at 310 and the energy costs associated with a given period of time calculated at 315.

In some embodiments, when the climate controls system 225 includes an electrical energy storage cooling device (e.g., a battery cooler), the controller 230 can determine an optimum operation of battery cooling based on an energy cost associated with automated control of the same determined at 315. For example, a battery management system of the power system 205 may request a battery cooler of the climate control system 225 to optimize the temperature of the battery bank used by the transport vehicle 200, but based on the energy cost calculated at 315 and the energy utilization calculated at 320 it may not be cost effective to use the battery cooler. The controller 230 can minimize use of the climate control system 225 for battery cooling or leverage a more energy or cost efficient procedure (such as using return air of the climate control system 225) to cool the battery pack.

While this embodiment describes the controller 230 modifying operation of the climate control system 225 based on the energy utilization calculated at 310 and/or the energy costs calculated at 315, in other embodiments, the remote server 245 can modify operation of the climate control system 225 based on the energy utilization calculated at 310 and/or the energy costs calculated at 315.

ASPECTS

It is to be appreciated that any of aspects 1-8 can be combined with any of aspects 9-15.

Aspect 1. A method for monitoring and displaying energy use and energy cost of a transport vehicle climate control system, the method comprising:

a controller monitoring and measuring energy parameters of the transport vehicle climate control system;

calculating energy utilization of the transport vehicle climate control system based on the energy parameters;

calculating energy costs of the transport vehicle climate control system based on the calculated energy utilization; and displaying the calculated energy utilization and the calculated energy costs of the transport climate control system on a user interface.

Aspect 2. The method of aspect 1, further comprising modifying operation of the transport vehicle climate control system based on the calculated energy utilization and the calculated energy costs.

Aspect 3. The method of any one of aspects 1-2, further comprising the controller sending the calculated energy utilization and the calculated energy costs of the transport climate control system to a remote server, wherein the remote server provides the calculated energy utilization and the calculated energy costs of the transport climate control system to the user interface.

Aspect 4. The method of any one of aspects 1-2, further comprising the controller sending the energy parameters of the transport climate control system to a remote server, wherein calculating the energy utilization of the transport vehicle climate control system is performed by the remote server, wherein calculating energy costs of the transport vehicle climate control system is performed by the remote server, and wherein the remote server provides the calculated energy utilization and the calculated energy costs of the transport climate control system to the user interface.

Aspect 5. The method of any one of aspects 1-4, wherein the transport vehicle climate control system includes a compressor, and wherein the energy parameters include one or more of an operating time of the compressor, a rotational velocity of the compressor, an operational frequency of the compressor, and a voltage and/or current supplied to the compressor.

Aspect 6. The method of any one of aspects 1-5, wherein the transport vehicle climate control system includes an air moving device, and wherein the energy parameters include one or more of an operating time of the air moving device, a rotational velocity of the air moving device, an operational frequency of the air moving device, and a voltage and/or current supplied to the air moving device.

Aspect 7. The method of any one of aspects 1-6, wherein the transport vehicle climate control system includes a compressor, and wherein the energy parameters include one or more of an operating time of the compressor, a rotational velocity of the compressor, an operational frequency of the compressor, and a voltage and/or current supplied to the compressor.

Aspect 8. The method of any one of aspects 1-7, further comprising the user interface displaying a graphical comparison of the transport vehicle climate control system compared to a fleet of transport vehicles with climate control systems, wherein the graphical comparison is at least one of a total energy utilization comparison, an energy use per unit of time in operation comparison, a total energy cost comparison, and an energy cost per unit of time in operation comparison.

Aspect 9. A climate control system for a transport vehicle comprising:

a refrigeration circuit configured to control an environmental condition of an internal space of the transport vehicle, wherein the refrigeration circuit includes a compressor, an exterior heat exchanger, and an interior heat exchanger; and a controller configured to control operation of the climate control system, wherein the controller is configured to:
monitor and measure energy parameters of a transport vehicle climate control system,
calculate energy utilization of the transport vehicle climate control system based on the energy parameters, and
calculate energy costs of the transport vehicle climate control system based on the calculated energy utilization;

wherein a user interface is configured to receive the calculated energy utilization and the calculated energy costs and is configured to display the calculated energy utilization and the calculated energy costs of the transport climate control system.

Aspect 10. The climate control system of aspect 9, wherein the controller is configured to modify operation of the transport vehicle climate control system based on the calculated energy utilization and the calculated energy costs.

Aspect 11. The climate control system of any one of aspects 9-10, wherein the controller is configured to send the calculated energy utilization and the calculated energy costs of the transport climate control system to a remote server, wherein the remote server is configured to provide the calculated energy utilization and the calculated energy costs of the transport climate control system to the user interface.

Aspect 12. The climate control system of any one of aspects 9-11, wherein the energy parameters include one or more of an operating time of the compressor, a rotational velocity of the compressor, an operational frequency of the compressor, and a voltage and/or current supplied to the compressor.

Aspect 13. The climate control system of any one of aspects 9-12, further comprising an air moving device, wherein the energy parameters include one or more of an operating time of the air moving device, a rotational velocity of the air moving device, an operational frequency of the air moving device, and a voltage and/or current supplied to the air moving device.

Aspect 14. The climate control system of any one of aspects 9-13, wherein the energy parameters include one or more of an operating time of the compressor, a rotational velocity of the compressor, an operational frequency of the compressor, and a voltage and/or current supplied to the compressor.

Aspect 15. The climate control system of any one of aspects 9-14, wherein the user interface is configured to display a graphical comparison of the transport vehicle climate control system compared to a fleet of transport vehicles with climate control systems, wherein the graphical comparison is at least one of a total energy utilization comparison, an energy use per unit of time in operation comparison, a total energy cost comparison, and an energy cost per unit of time in operation comparison.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for monitoring and displaying energy use and energy cost of a transport vehicle climate control system, the method comprising:
   a transport vehicle prime mover operating and moving a transport vehicle;
   a controller monitoring and measuring energy parameters of the transport vehicle climate control system, wherein monitoring and measuring the energy parameters of the transport vehicle climate control system includes monitoring a compressor energy parameter of a compressor of the transport vehicle climate control system driven by the transport vehicle prime mover used to move and operate the transport vehicle;
   calculating energy utilization of the transport vehicle climate control system based on the energy parameters, wherein calculating the energy utilization of the transport vehicle climate control system includes isolating energy, generated by the transport vehicle prime mover, being utilized by the transport vehicle climate control system by calculating a compressor energy utilization based on the compressor energy parameter;
   isolating energy costs of operating the transport vehicle prime mover to power the transport vehicle climate control system by calculating energy costs of the transport vehicle climate control system based on the calculated energy utilization, wherein isolating the energy costs of operating the transport vehicle prime mover to power the transport vehicle climate control system includes:
      accessing a current price of prime mover fuel powering the transport vehicle prime mover, and
      calculating energy costs of the transport vehicle climate control system based on the calculated compressor energy utilization and the current price of the prime mover fuel;
   displaying the calculated energy utilization and the calculated energy costs of the transport climate control system on a user interface; and
   automatically modifying operation of the transport vehicle climate control system based on the calculated energy utilization and the calculated energy costs.

2. The method of claim 1, further comprising the controller sending the calculated energy utilization and the calculated energy costs of the transport climate control system to a remote server,
   wherein the remote server provides the calculated energy utilization and the calculated energy costs of the transport climate control system to the user interface.

3. The method of claim 1, further comprising the controller sending the energy parameters of the transport climate control system to a remote server,
   wherein calculating the energy utilization of the transport vehicle climate control system is performed by the remote server,
   wherein calculating energy costs of the transport vehicle climate control system is performed by the remote server, and
   wherein the remote server provides the calculated energy utilization and the calculated energy costs of the transport climate control system to the user interface.

4. The method of claim 1,
   wherein the compressor energy parameter is at least one of an operating time of the compressor, a rotational velocity of the compressor, an operational frequency of the compressor, and a voltage and/or current supplied to the compressor.

5. The method of claim 1, wherein the transport vehicle climate control system includes an air moving device, and
   wherein the energy parameters include one or more of an operating time of the air moving device, a rotational velocity of the air moving device, an operational frequency of the air moving device, and a voltage and/or current supplied to the air moving device.

6. The method of claim 1, further comprising the user interface displaying a graphical comparison of the transport vehicle climate control system compared to a fleet of transport vehicles with climate control systems, wherein the graphical comparison is at least one of a total energy utilization comparison, an energy use per unit of time in operation comparison, a total energy cost comparison, and an energy cost per unit of time in operation comparison.

7. The method of claim 1, further comprising automatically selecting between the transport vehicle prime mover and an alternative energy source for powering the transport vehicle climate control system based on the energy parameters, the calculated energy utilization, and the calculated energy costs, wherein the alternative energy source is one of a transport vehicle battery, an auxiliary battery pack, a solar power source, and a utility power source.

8. The method of claim 1, further comprising:
   determining an optimum operation of battery cooling using an electrical energy storage cooling device based on the calculated energy cost, and
   modifying use of the vehicle transport climate control system to achieve the determined optimum operation of battery cooling.

9. A climate control system for a transport vehicle comprising:
   a refrigeration circuit configured to control an environmental condition of an internal space of the transport vehicle, wherein the refrigeration circuit includes a compressor, an exterior heat exchanger, and an interior heat exchanger;
   a transport vehicle prime mover configured to move and operate the transport vehicle and to drive the compressor; and
   a controller configured to control operation of the climate control system, wherein the controller is configured to:
      monitor and measure energy parameters of a transport vehicle climate control system including monitoring a compressor energy parameter of the compressor driven by the transport vehicle prime mover,
      calculate energy utilization of the transport vehicle climate control system based on the energy parameters by isolating energy, generated by the transport vehicle prime mover, being utilized by the transport vehicle climate control system, wherein isolating the energy, generated by the transport vehicle prime mover, being utilized by the transport vehicle climate control system includes the controller being configured to calculate a compressor energy utilization based on the compressor energy parameter, and isolate energy costs of operating the transport vehicle prime mover to power the transport vehicle climate control system by calculating energy costs of the transport vehicle climate control system based on the calculated energy utilization, wherein the controller is configured to isolate energy costs of operating the transport vehicle prime mover to power the transport vehicle climate control system by:

accessing a current price of prime mover fuel powering the transport vehicle prime mover, and calculating energy costs of the transport vehicle climate control system based on the calculated compressor energy utilization and the current price of the prime mover fuel;

wherein a user interface is configured to receive the calculated energy utilization and the calculated energy costs and is configured to display the calculated energy utilization and the calculated energy costs of the transport climate control system, and wherein the controller is configured to automatically modify operation of the transport vehicle climate control system based on the calculated energy utilization and the calculated energy costs.

10. The climate control system of claim 9, wherein the controller is configured to send the calculated energy utilization and the calculated energy costs of the transport climate control system to a remote server, wherein the remote server is configured to provide the calculated energy utilization and the calculated energy costs of the transport climate control system to the user interface.

11. The climate control system of claim 9, wherein the compressor energy parameter is at least one of an operating time of the compressor, a rotational velocity of the compressor, an operational frequency of the compressor, and a voltage and/or current supplied to the compressor.

12. The climate control system of claim 9, further comprising an air moving device, wherein the energy parameters include one or more of an operating time of the air moving device, a rotational velocity of the air moving device, an operational frequency of the air moving device, and a voltage and/or current supplied to the air moving device.

13. The climate control system of claim 9, wherein the user interface is configured to display a graphical comparison of the transport vehicle climate control system compared to a fleet of transport vehicles with climate control systems, wherein the graphical comparison is at least one of a total energy utilization comparison, an energy use per unit of time in operation comparison, a total energy cost comparison, and an energy cost per unit of time in operation comparison.

14. The climate control system of claim 9, wherein the controller is configured to automatically select between the transport vehicle prime mover and an alternative energy source for powering the transport vehicle climate control system based on the energy parameters, the calculated energy utilization, and the calculated energy costs, wherein the alternative energy source is one of a transport vehicle battery, an auxiliary battery pack, a solar power source, and a utility power source.

15. The climate control system of claim 9, wherein the controller is configured to determine an optimum operation of battery cooling using an electrical energy storage cooling device based on the calculated energy cost, and the controller is configured to modify use of the vehicle transport climate control system to achieve the determined optimum operation of battery cooling.

16. A method for monitoring and displaying energy use and energy cost of a transport vehicle climate control system of a vehicle and/or towed by the vehicle, wherein the transport vehicle climate control system includes a compressor and the transport vehicle climate control system is powered by a power system powering a transport vehicle, the method comprising:

a power system operating and moving the vehicle;

a controller monitoring and measuring energy parameters of the transport vehicle climate control system, wherein the energy parameters include one or more of a rotational velocity of the compressor, an operational frequency of the compressor, and a voltage and/or current supplied to the compressor;

calculating energy utilization of the transport vehicle climate control system based on the energy parameters that include one or more of the rotational velocity of the compressor, the operational frequency of the compressor, and the voltage and/or current supplied to the compressor;

isolating energy costs of the transport vehicle climate control system from a total energy cost of operating the transport vehicle based on the calculated energy utilization; and displaying the calculated energy utilization and the isolated energy costs of the transport climate control system on a user interface.

17. The method of claim 16, further comprising obtaining a total electrical power input available from the power system, and wherein isolating the energy costs of the transport vehicle climate control system from the total energy cost of operating the transport vehicle is based on the calculated energy utilization and the obtained total electrical power input.

* * * * *